United States Patent
Bartle

[11] Patent Number: 6,064,068
[45] Date of Patent: May 16, 2000

[54] SYSTEM AND METHOD FOR MONITORING THE STABILITY OF A SCINTILLATION DETECTOR

[75] Inventor: Colin M Bartle, Wilton, New Zealand

[73] Assignee: Institute of Geological & Nuclear Sciences Ltd., Lower Hunt, New Zealand

[21] Appl. No.: 08/872,894

[22] Filed: Jun. 11, 1997

[51] Int. Cl.[7] .................................................. G01T 1/202
[52] U.S. Cl. ............... 250/369; 250/363.09; 250/269.03; 250/252.1; 250/366
[58] Field of Search .............................. 250/369, 363.09, 250/269.03, 252.1, 366

[56] References Cited

U.S. PATENT DOCUMENTS 4,772,792   9/1988   Utts et al. ................................. 250/366

Primary Examiner—Constantine Hannaher
Assistant Examiner—Andrew Israel
Attorney, Agent, or Firm—Andrus, Sceales, Starke & Sawall

[57] ABSTRACT

A system for on-line monitoring the stability of a scintillation detector, comprises means providing two beams of gamma rays from a subsidiary source which are distinguishable because of their time relationship from the primary source. The two beams are of similar energies but are oriented in different directions, with one directed into the scintillation detector and one acting as a reference beam and directed to a reference beam counter. The ratio of the detector-count rate for the timed events to the reference count rate is compared to provide an indication of any drift in the scintillation detector.

5 Claims, 2 Drawing Sheets

SYSTEM AND METHOD FOR MONITORING THE STABILITY OF A SCINTILLATION DETECTOR

FIELD OF THE INVENTION

The invention comprises a system and method for monitoring the stability of a scintillation detector, typically in an industrial application.

BACKGROUND OF THE INVENTION

Traditionally, scintillation detectors have been used in research applications in laboratories but they are more recently finding important applications in industry. A particular problem with scintillation detectors using photomultipliers is that they are prone to gain drift which means that in continuous use the calibration may change significantly. This may require periodically stopping the industrial measurement and moving the detector to a re-calibration location which is a problem requirement. The scintillation detectors typically used to implement the measuring system described in New Zealand patent 213777/214666 also employ pulse shape discrimination to separate neutron and gamma events which is a temperature dependent process. A procedure adopted to minimise gain stabilisation problems is to control the temperature of the detector, but in practice gain changes can be expected to occur.

SUMMARY OF INVENTION

The present invention provides a system and method for monitoring the stability of a scintillation detector which can be arranged to sense gain changes in the scintillation detector simultaneously as a measuring system is operating without interruption of the measuring process.

In broad terms in a first aspect the invention comprises a system for monitoring the stability of a scintillation detector, comprising means providing two beams of gamma rays from a subsidiary source distinguishable because of their time relationship from that from which the rays primarily detected by the scintillation detector originate, the two beams being of similar energies and oriented in different directions with one directed into the scintillation detector and one acting as a reference beam and directed to a reference beam counter, and means to compare the ratio of the detector count rate for the timed events to the reference count rate to provide an indication of any drift in the scintillation detector.

In broad terms in a further aspect the invention comprises a method for monitoring the stability of a scintillation detector, comprising directing a beam of gamma rays from a subsidiary source distinguishable from that from which the rays primarily detected by the scintillation detector originate into the scintillation detector, and directing a second beam of gamma rays from the subsidiary source to a reference beam counter, and comparing the ratio of the detector count rate for the timed events to the reference count rate to indicate any drift in the gamma ray detector.

The system of the invention can be used to simultaneously sense changes in gain of any scintillation detector such as a gamma ray detector, x-ray detector, electron or neutron detector or other detector which is also sensitive to gamma radiation, even when the detector is simultaneously in use and counting at high rates, of greater than 100,000 counts per second for example. The detector need not resolve the gamma ray events in a peak - a continuous spectrum distribution is excellent for monitoring purposes.

The system of the invention may be incorporated in an industrial measuring apparatus as original equipment or may be attached as a retrofit to an existing detector system operating with existing detector electronics.

BRIEF DESCRIPTION OF DRAWINGS

A preferred form of the system of the invention will now be described to further illustrate the system and method of the invention, by way of example and without intending to be limiting, with reference to the accompanying drawings in which.

DETAILED DESCRIPTION OF PREFERRED FORM

Figure 1:
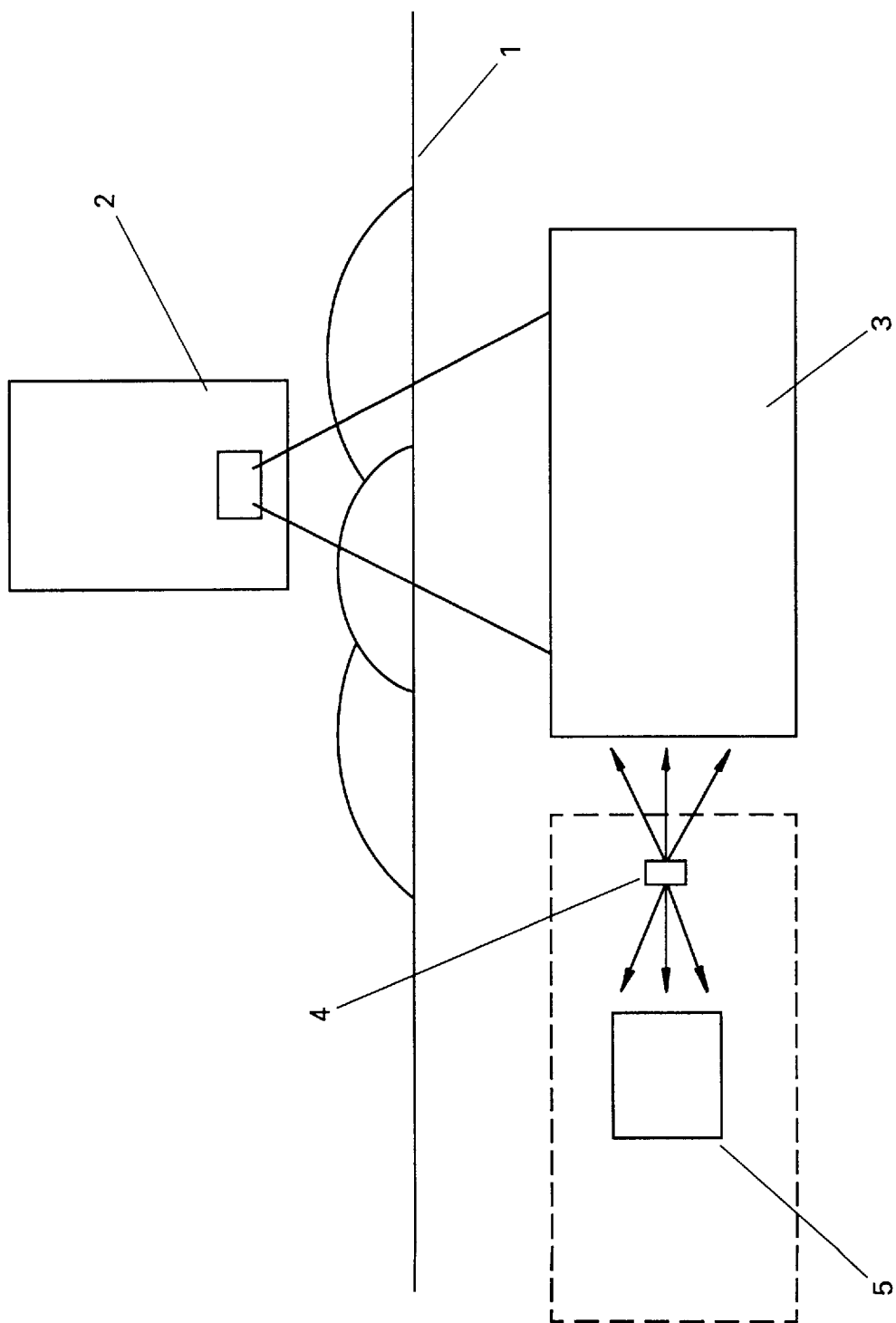
FIG. 1 schematically illustrates the operation of the system of the invention.

FIG. 1 schematically illustrates an industrial measuring apparatus in which items to be scanned are passed by means of a conveyor 1 between a primary radiation source 2 and a primary scintillation cell or detector 3. The primary source may be a Cf-252 neutron-gamma source for example.

A low level subsidiary gamma source 4 with suitable collimation provides one stream of gamma radiation which is aimed into the primary scintillation cell 3 and another stream which is used as a reference and is aimed into a reference counter 5. The subsidiary source may be a Na-22 source or a Co-60 source for example. In the preferred form system the primary source provides fast neutron and gamma radiation with which the items under test are irradiated, both neutron and gamma radiation are detected, and the extent to which each species of the source radiation is transmitted through the item is measured by the detector 3 and analysed.

The subsidiary source 4 provides two gammas beams at 511 keV simultaneously, moving with identical energies and preferably in exactly opposite directions. Because of the time relationship of these gamma beams detected by the reference counter 5 and the primary detector 3, those detected in the primary detector 3 can be distinguished from the other counts in the primary detector, from the main source. The reference channel is used to "tag" the responses from the main detector 3. While the main detector 3 is in use in industrial applications, gamma pulses from the main detector can be identified as from the subsidiary Na-22 source 4, rather than from the primary Cf-252 neutron/gamma source. The ratio between the reference count-rate and the main detector count-rate from the Na-22 source is used to determine the gain of the main detector, and forms the measurement section of a gain stabilisation system for the main detector 3. The system acts as a satellite counting system to the main detector and operates simultaneously as the system is in use in an industrial application. As long as the reference channel is counting only 511 ke V gamma rays, the system is insensitive to the gain of the reference detector 5.

Figure 2:
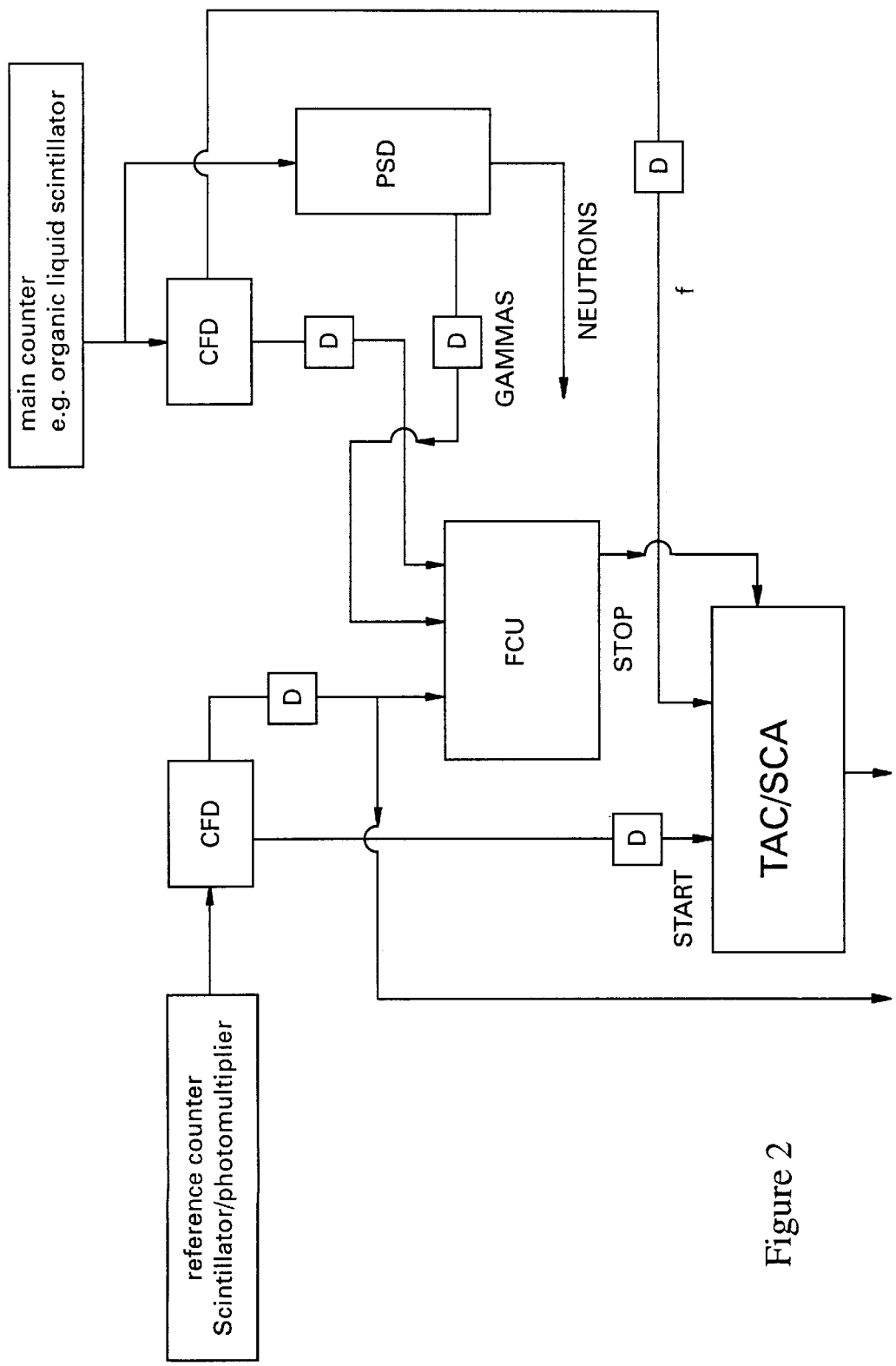
FIG. 2 is a block diagram of electronic systems of the preferred form system.

FIG. 2 is a block diagram of the electronics systems of such a preferred form of the system.

A NaI(Tl) (sodium iodide) scintillator mounted on a photomultiplier may be used as the reference sensor or counter. A constant fraction discriminator CFD (the reference CFD) is used to select a range of pulse heights corresponding to the gamma ray events of interest. This will normally be the photo-electric events corresponding to the reference source gamma rays. These events determine the single channel analyser SCA output from the CFD and are fed via delay D as one of the coincidence requirements to the fast coincidence unit FCU.

The output from the main counter (which in this instance is a detector for neutrons and gamma rays in a mixed beam) is fed to a pulse shape discriminator PSD (which separates the neutron and gamma ray events for the industrial measurement application) and also to a second constant fraction discriminator (the main CFD). Only gamma ray events in the main counter are of interest from the viewpoint of the stabilisation system. The gamma ray output selection from the PSD is fed as one of the coincidence requirements to the FCU via delay D. The CFD is used to select the range of gamma ray energies in the main detector which are associated with the detection of reference source gamma rays. These events determine the single channel analyser SCA outputs from the CFD and are fed as one of the coincidence requirements to the FCU via delay D.

Often the subsidiary source will contain the Na-22 isotope. In summary, Na-22 pulses from the subsidiary source detected in the reference counter; Na-22 pulses from the subsidiary source detected with the main counter, plus other events in the same pulse range detected from the main source; and pulses identifying the main detector events as gamma rays are combined at the FCU. Only if all three are in coincidence will the output from the FCU provide a gating pulse to the time-to-amplitude-convertor/single-channel-analyser TAC/SCA. This procedure determines an initial condition on the main counter events that they should be gamma rays in coincidence with the events in the reference counter. However in high count ray applications in the main detector, this condition cannot be determined with sufficient time precision with the FCU alone. The FCU output is used as a gating system for a much more precise time measurement capability using the TAC/SCA unit. The TAC/SCA unit makes use of the fact timing outputs from the two CFD units.

The fast timing outputs from the reference CFD and the main CFD are used as the 'Start' and 'Stop' inputs respectively to the TAC/SCA to which they are fed via delay D. Typically the events in the reference counter will be used to start the TAC/SCA and the events in the main counter to stop the TAC/SCA. The single channel analyser SCA section is used to set a 'window' on the timing peak corresponding to the coincident events in the two detectors. Typically the timing peak width will be a full-width-half-maximum about 2 times one thousandth billionth of a second (2 nanoseconds). This time identification is so precise that the main counter can be counting at rates of about 100,000 counts per second in the industrial application yet the coincident Na-22 events can be detected and distinguished from the events in the main counter produced by the main source.

In practice, some of these apparent timed Na-22 events will be chance events and are subtracted by a simple numerical calculation in software manipulation.

To facilitate the correct timing of the pulses from the different detectors, delays (or lengths of cables in which the signals travel) are used in the electronic connections to the FCU and the TAC/SCA.

The way in which the gain state the main counter is monitored is as follows. The count rate of events from the main counter is determined by the combination of the range of pulse heights which can activate the main CFD and the gain settings of the main counter. The main CFD sets a threshold voltage level below which events are not counted and a maximum pulse height level above which events are not counted. The threshold level may be used for example to eliminate electronic noise pulses, and the maximum level to exclude pulses which pile-up and produce abnormally big voltage pulses. Since the main CFD settings are maintained constant in operation, changes in the count-rate of events from the TCA/SCA give a measure of changes in the main counter gain. In practice, the TCA/SCA count-rate may also be influenced by changes in the gain of the reference counter, since an active pulse height range is also set with the reference CFD for the reference counter pulses. The sensitivity to the gain changes of the reference counter can however be eliminated by recording the ratio of the count-rate from the TAC/SCA(j) to the count-rate from the reference CFD(i). This can occur while the main counter is being used at 100,000 events per second count rates in an industrial application.

As stated the system of the invention may be fitted as a retrofit, for example to the outside of the existing detector system, or may be incorporated in industrial measuring or laboratory measuring equipment as original equipment.

The foregoing describes one preferred form of the system of the invention which illustrates the principle of the invention and is not intended to be limiting, and alterations and modifications as will be apparent to those skilled in the art are intended to be incorporated within the scope hereof as defined in the following claims.

What is claimed is:

1. A measuring system comprising a primary source and a scintillation detector, and including means for monitoring the stability of the scintillation detector simultaneously with the operation of the measuring system, said means for monitoring the stability of the scintillation detector being arranged to operate simultaneously with the measuring system of which the primary source and scintillation detector form a part, and providing two beams of gamma rays from a subsidiary source distinguishable because of their time relationship from the primary source from which the rays primarily detected by the scintillation detector originate, the two beams being of similar energies and oriented in different directions with one directed into the scintillation detector and one acting as a reference beam and directed to a reference beam counter, and means to compare the ratio of the detector-count rate to the reference count rate to provide an indication of any drift in the scintillation detector.

2. A system according to claim 1, wherein the two beams of gamma rays from the subsidiary source are directed from the subsidiary source in exactly opposite directions one to the scintillation detector and one to the reference beam counter.

3. A system according to claim 1 which forms part of a gain stabilization system for said scintillation detector.

4. A method for monitoring the stability of a scintillation detector comprising a measuring system with a primary source, comprising simultaneously with operation of the measuring system directing a beam of gamma rays from a subsidiary source distinguishable from a primary source from which the rays primarily detected by the scintillation detector originate into the scintillation detector, and directing a second beam of gamma rays from the subsidiary source to a reference beam counter, and comparing the ratio of the detector count rate to the reference count rate to indicate any drift in the gamma ray detector.

5. A method according to claim 4 including directing the two beams of gamma rays from the subsidiary source in exactly opposite directions, one to the scintillation detector and one to the reference beam counter.

* * * * *